(12) United States Patent
Malcolm

(10) Patent No.: US 8,288,884 B1
(45) Date of Patent: Oct. 16, 2012

(54) WIND TURBINE WITH INTEGRATED SOLAR PANELS

(76) Inventor: William Malcolm, Rutherfordton, NC (US)

( * ) Notice: Subject to any disclaimer, the term of this patent is extended or adjusted under 35 U.S.C. 154(b) by 449 days.

(21) Appl. No.: 12/579,622

(22) Filed: Oct. 15, 2009

(51) Int. Cl.
*F03D 9/00* (2006.01)
(52) U.S. Cl. ........................................... 290/55; 290/44
(58) Field of Classification Search ................ 60/641.11
See application file for complete search history.

(56) References Cited

U.S. PATENT DOCUMENTS

| | | |
|---|---|---|
| D243,408 S | 2/1977 | McAllister |
| 4,171,491 A | 10/1979 | Theyse |
| 4,200,904 A | 4/1980 | Doan |
| 4,224,528 A | 9/1980 | Argo |
| 4,315,163 A | 2/1982 | Bienville |
| 5,254,876 A | 10/1993 | Hickey |
| 6,560,131 B1 | 5/2003 | vonBrethorst |
| D511,495 S | 11/2005 | Okubo et al. |
| 7,045,702 B2 | 5/2006 | Kashyap |
| 7,105,940 B2 * | 9/2006 | Weesner et al. ............... 290/44 |
| 7,321,173 B2 | 1/2008 | Mann |
| 7,851,935 B2 * | 12/2010 | Tsao ............................ 290/44 |
| 2007/0090653 A1 * | 4/2007 | Martelon .................... 290/55 |
| 2009/0186745 A1 * | 7/2009 | Lewiston ...................... 482/2 |
| 2009/0200808 A1 * | 8/2009 | Parmley, Sr. ................ 290/55 |
| 2009/0273922 A1 * | 11/2009 | Ho et al. .................... 362/183 |
| 2010/0090605 A1 * | 4/2010 | Nevins ....................... 315/159 |
| 2010/0314876 A1 * | 12/2010 | Frayne ........................ 290/44 |
| 2011/0006540 A1 * | 1/2011 | Ignatiev et al. .............. 290/55 |
| 2011/0204644 A1 * | 8/2011 | Perregrini .................. 290/53 |

* cited by examiner

*Primary Examiner* — Michael Zarroli

(57) ABSTRACT

The wind turbine with integrated solar panels involves a wind turbine wherein solar cells attach to the tower supporting the wind turbine. The solar cells are mounted upon a railing system that enables the solar cells to swivel vertically and rotate about the tower in order to follow the sun in the sky.

5 Claims, 5 Drawing Sheets

WIND TURBINE WITH INTEGRATED SOLAR PANELS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

The present invention relates to the field of wind turbines, more specifically, a stationary wind turbine having a plurality of solar panels that are attached to the tower supporting the wind turbine.

B. Discussion of the Prior Art

As a preliminary note, it should be stated that there is an ample amount of prior art that deals with wind turbines and solar panels. As will be discussed immediately below, no prior art discloses a stationary wind turbine having solar panels attached to the tower supporting the wind turbine, or of which enable movement of the solar cells thereon to follow sunlight.

The Hickey Patent (U.S. Pat. No. 5,254,876) discloses a combined solar and wind powered generator with spiral surface pattern. However, the solar cells are disposed of on the wind upon the tower itself.

The Kashyap Patent (U.S. Pat. No. 7,045,702) discloses a solar-paneled windmill having aerodynamic fan blades provided with solar panels. However, the solar-paneled windmill places the solar cells on the windmill blades as opposed to the windmill tower.

The Mann Patent (U.S. Pat. No. 7,321,173) discloses a light for illuminating a portion of a roadway that is powered by a series of wind receptacles and photovoltaic cells to facilitate the generation and storage of electrical energy required to illuminate the light. However, the solar cells are mounted atop the wind receptacles as opposed to the tower supporting the wind receptacles.

The Argo Patent (U.S. Pat. No. 4,224,528) discloses a solar, thermal, and wind energy power source. However, the power source does not teach a plurality of solar cells mounted upon the tower of the wind turbine.

The Theyse Patent (U.S. Pat. No. 4,171,491) discloses a plant for generating and accumulating electric energy with the aid of wind power or solar energy. However, the plant has the solar energy and wind energy derived from different locales as opposed to a single locale wherein the solar panels are positioned on the tower of the wind turbine.

The vonBrethorst Patent (U.S. Pat. No. 6,560,131) discloses an electrical battery storage system enclosed in a single housing for connecting directly to solar and/or wind electrical power generation systems and further ready to be connected directly to a home electrical system. However, the system is directed to battery systems and not energy production sources.

The Doan Patent (U.S. Pat. No. 4,200,904) discloses a solar powered streetlight and traffic control system. However, the system is directed to powering a streetlight and traffic control as opposed to a wind turbine having solar cells mounted upon the tower of the wind turbine.

The Okubo et al. Patent (U.S. Pat. No. Des. 511,495) illustrates an ornamental design for a wind power generator, which does not depict any solar cells.

The McAllister Patent (U.S. Pat. No. Des. 243,408) illustrates an ornamental design for a wind driven electric generator, which does not depict any solar cells.

While the above-described devices fulfill their respective and particular objects and requirements, they do not describe a stationary wind turbine having solar panels attached to the tower supporting the wind turbine, or of which enable movement of the solar cells thereon to follow sunlight. In this regard, the wind turbine with integrated solar panels departs from the conventional concepts and designs of the prior art.

SUMMARY OF THE INVENTION

The wind turbine with integrated solar panels involves a wind turbine wherein solar cells attach to the tower supporting the wind turbine. The solar cells are mounted upon a railing system that enables the solar cells to swivel vertically and rotate about the tower in order to follow the sun in the sky.

It is an object of the invention is to provide a wind turbine having solar cells integrated onto the tower that supports the wind turbine.

It is a further object of the invention to provide the solar cells with the ability to tilt vertically with respect to the tower in order to follow movement of the sun in the sky.

It is a further object of the invention to provide the solar cells with the ability to rotate about the tower in order to follow movement of the sun in the sky.

These together with additional objects, features and advantages of the wind turbine with integrated solar panels will be readily apparent to those of ordinary skill in the art upon reading the following detailed description of presently preferred, but nonetheless illustrative, embodiments of the wind turbine with integrated solar panels when taken in conjunction with the accompanying drawings.

In this respect, before explaining the current embodiments of the wind turbine with integrated solar panels in detail, it is to be understood that the wind turbine with integrated solar panels is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wind turbine with integrated solar panels. It is therefore important that the claims be regarded as including such equivalent construction insofar as they do not depart from the spirit and scope of the wind turbine with integrated solar panels. It is also to be understood that the phraseology and terminology employed herein are for purposes of description and should not be regarded as limiting.

BRIEF DESCRIPTION OF THE DRAWINGS

The accompanying drawings, which are included to provide a further understanding of the invention and are incorporated in and constitute a part of this specification, illustrate, embodiments of the invention and together with the description serve to explain the principles of the invention.

In the drawings.

DETAILED DESCRIPTION OF THE EMBODIMENT

Figure 1:
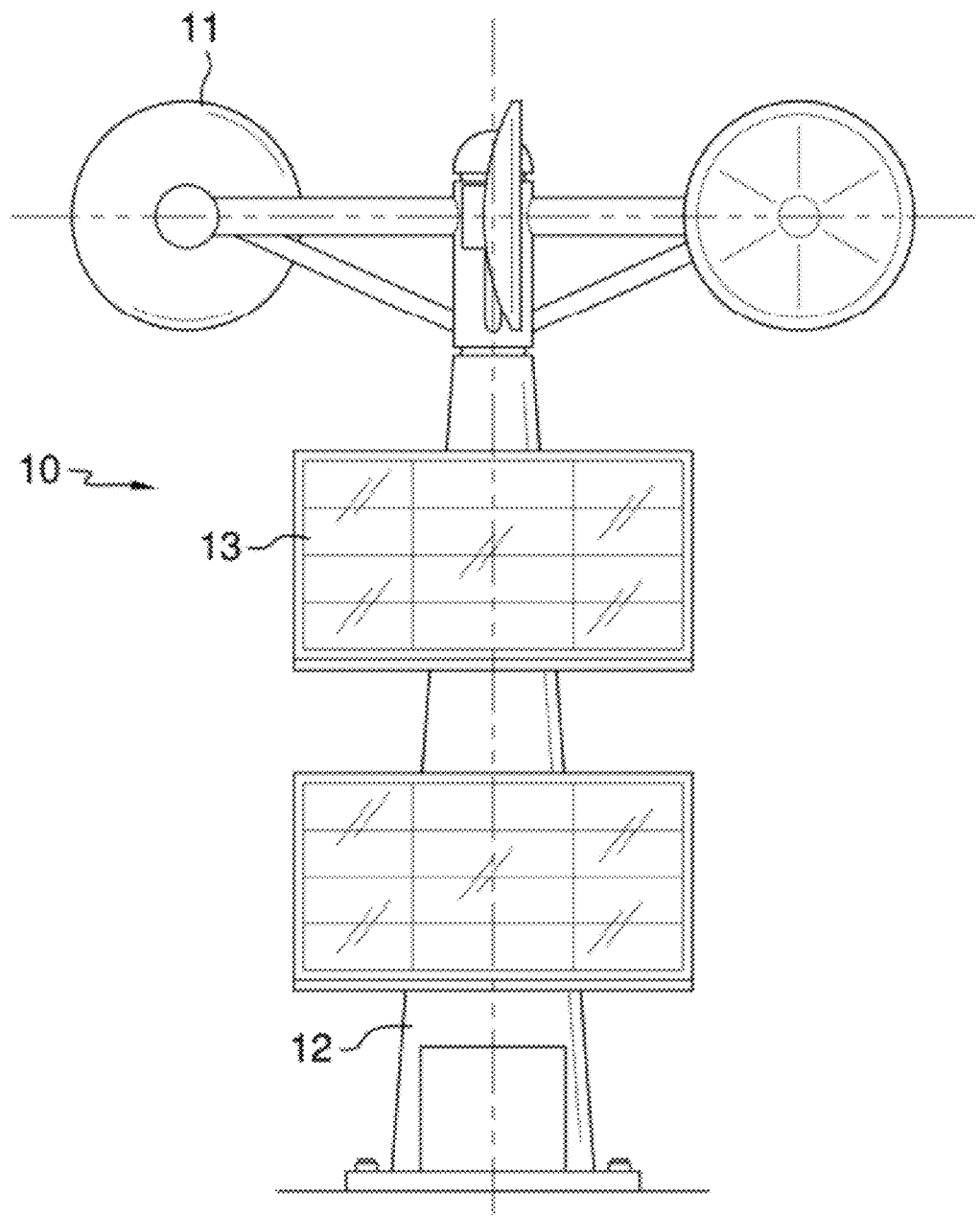
FIG. 1 illustrates a front view of the wind turbine with solar cells.
Figure 2:
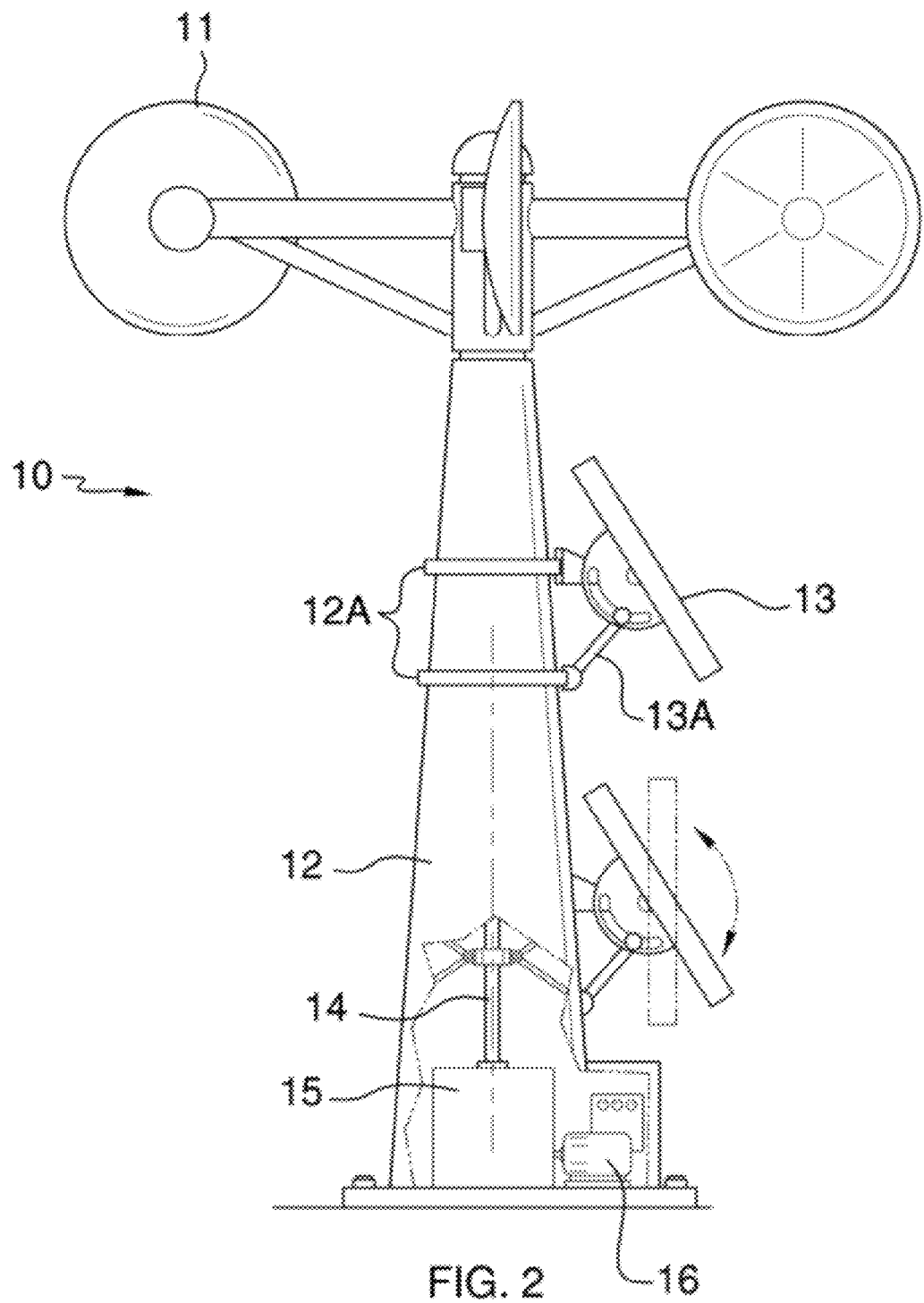
FIG. 2 illustrates a side view of the wind turbine with solar cells and a cut-away view of the generator, drive shaft, and gear reducer; as well as detail concerning the rail system that enables the solar cells to rotate about the tower as well as the tilting bracket that enables the solar cells to tilt.
Figure 2A:
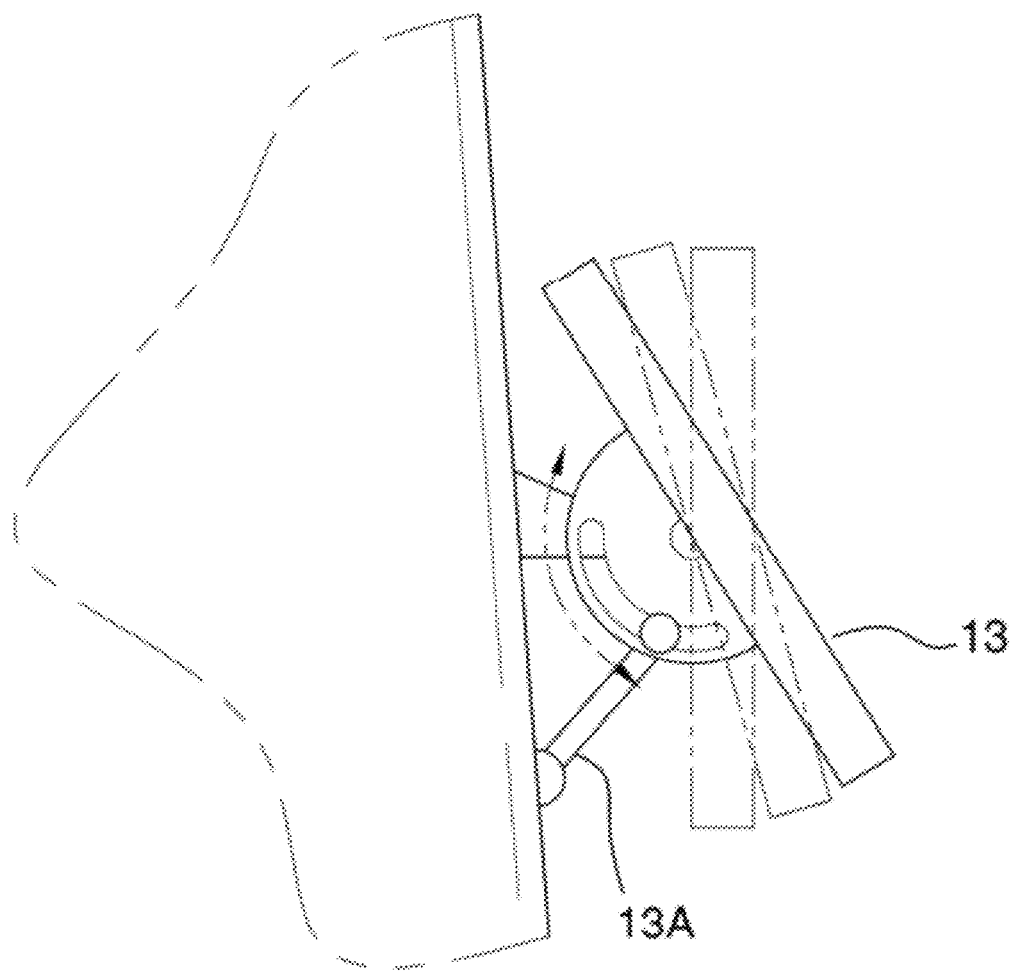
FIG. 2A illustrates a detailed view of the tilting bracket showing the solar cell tilting with respect to the tower.
Figure 3:
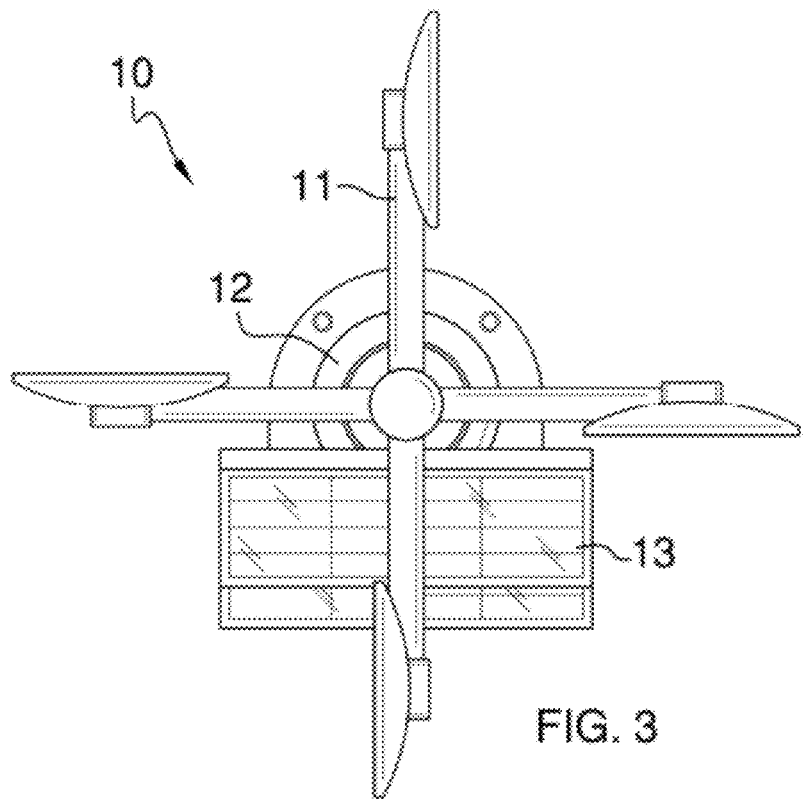
FIG. 3 illustrates a top view of the wind turbine with solar cells.
Figure 4:
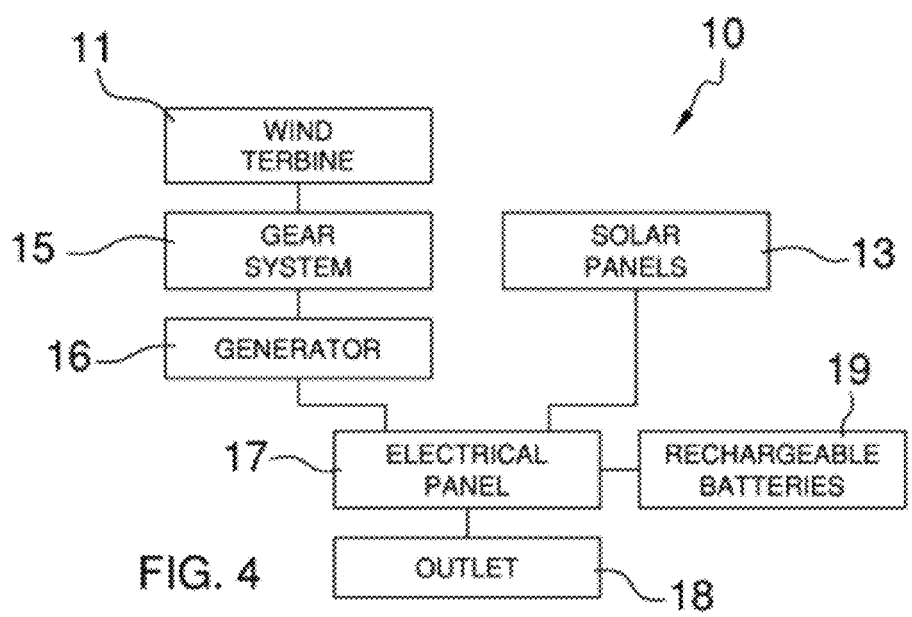
FIG. 4 illustrates an electrical diagram of the various components of the wind turbine with solar cells.

Detailed reference will now be made to the preferred embodiment of the present invention, examples of which are illustrated in FIGS. 1-5. A wind turbine with integrated solar panels 10 (hereinafter invention) includes a wind turbine 11 mounted atop a tower 12, and at least one solar cell 13.

The wind turbine 11 rotates a drive shaft 14 that connects to a gear reducer 15, and in turn a generator 16.

Both the generator 16 and the solar cell 13 provide electrical power to an electrical panel 17, which in turn provides electrical energy output to an outlet 18.

At least one rechargeable battery 19 is provided to operate the mobility function of the solar cell 13 described below.

The solar cell 13 is mounted onto a frame 13A that enables the solar cell 13 to tilt vertically in order to track sunlight in the sky above. The frame 13A can also or alternatively be adapted to rotate about the tower 12 via rail 12A integrated into the design of the tower 12, such that the frame 13A of the solar cell 13 can rotate about the tower 12 in order to enable the solar cell 13 to track the sunlight in the sky above.

The ability of the solar cell 13 to tilt via the frame 13A is accomplished via a tilting motoring means that rotates the frame 13A with respect to the tower 12, and thus tilts the solar cell 13 thereon.

The ability of the solar cell 13 to rotate about the tower 12 is accomplished via the rail 12A integrated into the design of the tower 12 and a rotating motoring means that enables the solar cell 13 to be moved about the rail 12A.

It shall be noted that both the rotating motoring means and the tilting motoring means are to be powered by electricity from the rechargeable battery 19.

Figure 5:
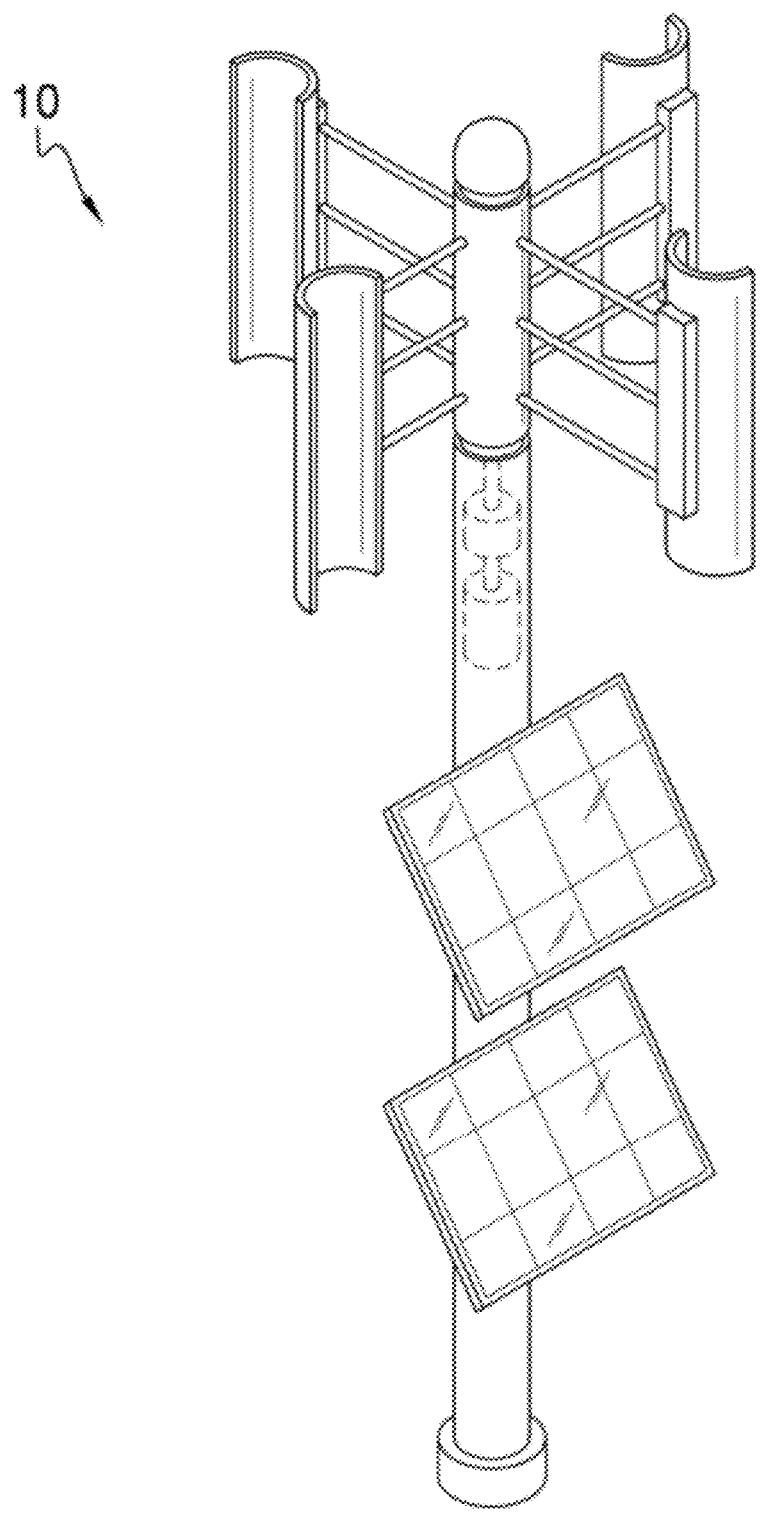
FIG. 5 illustrates an isometric view of an alternative embodiment of the invention.

FIG. 5 depicts an alternative embodiment of the invention 10 wherein the wind turbine has different geometries, and wherein the generator or gear system are suspended within the tower of the wind turbine.

With respect to the above description, it is to be realized that the optimum dimensional relationship for the various components of the invention 10, to include variations in size, materials, shape, form, function, and the manner of operation, assembly and use, are deemed readily apparent and obvious to one skilled in the art, and all equivalent relationships to those illustrated in the drawings and described in the specification are intended to be encompassed by the invention 10.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A wind turbine with integrated solar cells further comprising:

tower for supporting said wind turbine, and said solar cells are mounted to said tower;

wherein said solar cells can tilt vertically in order to track the path of sunlight;

wherein said solar cells can rotate horizontally about the tower in order to track the path of sunlight;

wherein said wind turbine rotates a generator, which supplies electrical power to an electrical panel, and wherein said solar cells yield electrical power to said electrical panel;

wherein said solar cells are mounted onto a frame that enables the solar cell to tilt vertically with respect to said tower, and in order to track sunlight in the sky above;

said solar cells tilt via tilting motoring means;

wherein the frame can also rotate about the tower via a rail integrated into the design of the tower, such that the frame of the solar cell can rotate about the tower in order to enable the solar cell to track the sunlight in the sky above;

wherein rotating motoring means are included to move the solar cells along the rail thereby rotating the solar cells around the tower;

wherein the rotating motoring means and the tilting motoring means are individually powered from power generated to the electrical panel via the solar cells and wind turbine.

2. The wind turbine as described in claim 1 wherein at least one rechargeable battery is included, and of which receives electrical power from said electrical panel, and wherein said rechargeable battery provides electrical power.

3. The wind turbine as described in claim 2 wherein said rechargeable battery can tilt said solar cells vertically in order to track the path of sunlight.

4. The wind turbine as described in claim 2 wherein said rechargeable battery can rotate said solar panels horizontally about the tower via in order to track the path of sunlight.

5. The wind turbine as described in claim 2 wherein said rechargeable battery can both tilt said solar cells vertically in order to track the path of sunlight as well as rotate horizontally about the tower in order to track the path of sunlight.

\* \* \* \* \*